United States Patent
Matsuo et al.

(10) Patent No.: US 8,089,927 B2
(45) Date of Patent: Jan. 3, 2012

(54) WIRELESS COMMUNICATION DEVICE

(75) Inventors: Ryoko Matsuo, Tokyo (JP); Tomoya Tandai, Tokyo (JP); Toshihisa Nabetani, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 819 days.

(21) Appl. No.: 12/186,878

(22) Filed: Aug. 6, 2008

(65) Prior Publication Data

US 2009/0040965 A1 Feb. 12, 2009

(30) Foreign Application Priority Data

Aug. 10, 2007 (JP) ................................ P2007-209836

(51) Int. Cl.
*H04W 4/00* (2009.01)
*H04B 7/212* (2006.01)

(52) U.S. Cl. .......................... 370/329; 370/341; 370/348

(58) Field of Classification Search .................. 370/328, 370/329, 341, 348, 431; 455/434, 450, 455, 455/509, 515, 41.2
See application file for complete search history.

(56) References Cited

U.S. PATENT DOCUMENTS

| | | | |
|---|---|---|---|
| 7,596,388 B2 * | 9/2009 | Willins et al. | 455/562.1 |
| 2006/0056362 A1 * | 3/2006 | Jang et al. | 370/336 |
| 2007/0160021 A1 * | 7/2007 | Xhafa et al. | 370/338 |
| 2007/0171858 A1 * | 7/2007 | Grandhi et al. | 370/328 |
| 2007/0258384 A1 * | 11/2007 | Sammour et al. | 370/252 |

FOREIGN PATENT DOCUMENTS

JP 2005-303585 10/2005

* cited by examiner

*Primary Examiner* — Sonny Trinh
(74) *Attorney, Agent, or Firm* — Turocy & Watson, LLP (57) ABSTRACT

A wireless communication device includes: an analyzing unit for analyzing an MAC header of a received frame; a storage unit for storing a source address when analyzed that the received frame is a suspension signal for suspending an occupancy of a radio channel; a determination unit for determining whether or not the source address of the received frame is stored in the storage unit when analyzed that a destination address of the received frame is for other device; and a power controlling unit for suspending a power supply to the demodulation unit and the analyzing unit for a remaining time of a period for occupying the radio channel which is described on the MAC header when determined that the source address is not stored.

13 Claims, 6 Drawing Sheets

WIRELESS COMMUNICATION DEVICE

RELATED APPLICATION(S)

The present disclosure relates to the subject matter contained in Japanese Patent Application No. 2007-209836 filed on Aug. 10, 2007, which is incorporated herein by reference in its entirety.

FIELD

The present invention relates to a wireless communication device.

BACKGROUND

In recent years, a wireless local area network (wireless LAN) system based on the IEEE802.11 standards has been widely spread. A wireless communication device provided in the wireless LAN system performs a communication through a radio channel in accordance with a CSMA/CA (carrier sense multiple access with collision avoidance) method. In order to prevent a collision from being generated through a transmission of plurality of signals to the same radio channel at the same time, the wireless communication device occupies the radio channel before performing the communication. The wireless communication device sets an NAV (network allocation vector) for a certain time period in order to occupy the radio channel. For the time period in which the NAV is set, the wireless communication device setting the NAV performs the communication through the radio channel and the other wireless communication device restrains the communication.

The wireless communication device is mounted on a portable terminal such as a mobile personal computer powered by a battery. In order to provide the function of the wireless LAN without giving an inconvenience to a user, therefore, it is important to reduce power consumption of the wireless communication device as greatly as possible.

In the IEEE802.11a/b/g standards, SISO (single input single output) is employed for usage of an antenna for performing communication. However, the IEEE802.11n standard, which is being developed, is compatible with MIMO (multi input multi output) for usage of an antenna for performing communication. For this reason, a wireless communication device compatible with MIMO can implement a higher speed and higher stable wireless communication, although power consumption is increased. Accordingly, it is more important in the wireless LAN system to reduce the power consumption of the wireless communication device.

As a technique for reducing the power consumption of the wireless communication device, the following technique has been reported. Specifically, when a signal indicating that a destination address is other wireless communication devices is received, a time required for a communication of the signal is calculated from a frame size described in a PHY (physical layer) header of the received signal and a frame transmitting speed, and a receiving operation of a receiver unit of the wireless communication device is suspended assuming that a radio channel is occupied by the other wireless communication devices during the calculated time. An example of such system is disclosed in JP-A-2005-303585 (counterpart U.S. publication is: U.S. Pat. No. 7,382,764 B2).

The IEEE802.11n standards are planned to be compatible with a Long NAV. The Long NAV is defined by IEEE802.11 Task Group n (TGn) as a NAV for occupying a radio channel for a longer period than the NAV based on the existing IEEE802.11 standards.

The wireless communication device setting the Long NAV can transmit a signal (CF_End signal: Contention Free End) for suspending the occupancy of the radio channel, thereby suspending the occupancy of the radio channel differently from the case in which the conventional NAV is set.

For example, in the case in which the wireless communication device suspends the receiving operation of the receiver unit of the wireless LAN for a period in which the Long NAV is set to reduce the power consumption, the wireless communication device cannot receive the CF_End signal and cannot detect that the occupancy of the radio channel is suspended even if the CF_End signal is transmitted from another wireless communication device to suspend the occupancy of the radio channel in the middle of the suspension of the receiving operation of the receiver unit in the wireless LAN.

Irrespective of the non-occupancy of the radio channel, therefore, the wireless communication device suspends the receiving operation of the receiver unit of the wireless LAN to restrain the transmission of the signal. Moreover, there is a possibility that the radio channel might be further occupied by the other wireless communication device while the wireless communication device restrains the transmission of the signal. In this case, the wireless communication device has a problem in that a signal cannot be transmitted and a transmitting delay is thus increased for a set period of the Long NAV or a longer period through the other wireless communication device.

SUMMARY

According to a first aspect of the invention, there is provided a wireless communication device capable of transmitting and receiving frames by occupying a radio channel for a certain time period, the device including: a demodulation unit that demodulates a frame received through the radio channel and outputs the demodulated frame as a received frame; an analyzing unit that operates to: analyze an MAC header included in the received frame output from the demodulation unit; determine whether the received frame includes a destination address that is different from an address assigned to the device; and determine, when determined that the destination address is different from the address assigned to the device, whether the received frame includes a suspension signal for suspending the occupancy of the radio channel; a storage unit that stores a source address included in the received frame when the analyzing unit determines that the received frame includes the suspension signal; a determination unit that determines whether the source address included in the received frame is previously stored in the storage unit when the analyzing unit determines that the received frame includes the destination address that is different from the address assigned to the device; and a power controlling unit that suspends at least a part of a power supply to the demodulation unit and the analyzing unit for a remaining time of the time period for occupying the radio channel, the time period being described in the MAC header, when the determination unit determines that the source address included in the received frame is not previously stored in the storage unit.

According to a second aspect of the invention, there is provided a wireless communication device capable of transmitting and receiving frames by occupying a radio channel for a certain time period, the device including: a demodulation unit that demodulates a frame received through the radio channel and outputs the demodulated frame as a received frame; an analyzing unit that operates to: analyze an MAC header included in the received frame output from the demodulation unit; determine whether the received frame includes a destination address that is different from an address assigned to the device; and determine, when determined that the destination address is different from the address assigned to the device, whether the received frame includes a suspension signal for suspending the occupancy of the radio channel; a storage unit that stores a transmission frequency of the suspension signal in correlation with a source address included in the received frame when the analyzing unit determines that the received frame includes the suspension signal; a determination unit that determines whether the transmission frequency corresponding to the source address included in the received frame is equal to or lower than a threshold value when the analyzing unit determines that the received frame includes the destination address that is different from the address assigned to the device; and a power controlling unit that suspends at least a part of a power supply to the demodulation unit and the analyzing unit for a remaining time of the time period for occupying the radio channel, the time period being described in the MAC header, when the determination unit determines that the transmission frequency corresponding to the source address included in the received frame is equal to or lower than the threshold value.

According to a third aspect of the invention, there is provided a wireless communication device wirelessly connectable to an access point through a radio channel and capable of transmitting and receiving frames by occupying the radio channel for a certain time period, the device including: a demodulation unit that demodulates a frame received through the radio channel and outputs the demodulated frame as a received frame; an analyzing unit that operates to: analyze an MAC header included in the received frame output from the demodulation unit; determine whether the received frame includes a destination address that is different from an address assigned to the device; and determine, when determined that the destination address is different from the address assigned to the device, whether the received frame includes a notification signal sent from the access point; a storage unit that stores the number of connections established by the access point with other devices described in the notification signal when the analyzing unit determines that the received frame includes the notification signal; a determination unit that determines whether the number of connections stored in the storage unit is equal to or smaller than a threshold value when the analyzing unit determines that the received frame includes the destination address that is different from the address assigned to the device; and a power controlling unit that suspends at least a part of a power supply to the demodulation unit and the analyzing unit for a remaining time of the time period for occupying the radio channel, the time period being described in the MAC header, when the determination unit determines that the number of connections stored in the storage unit is equal to or smaller than the threshold value.

According to a fourth aspect of the invention, there is provided a wireless communication device wirelessly connectable to an access point through a radio channel and capable of transmitting and receiving frames by occupying the radio channel for a certain time period, the device including: a demodulation unit that demodulates a frame received through the radio channel and outputs the demodulated frame as a received frame; an analyzing unit that operates to: analyze an MAC header included in the received frame output from the demodulation unit; determine whether the received frame includes a destination address that is different from an address assigned to the device; and determine, when determined that the destination address is different from the address assigned to the device, whether the received frame includes a notification signal sent from the access point; a storage unit that stores a channel usage rate of the radio channel by the access point described in the notification signal when the analyzing unit determines that the received frame includes the notification signal; a determination unit that determines whether the channel usage rate stored in the storage unit is equal to or smaller than a threshold value when the analyzing unit determines that the received frame includes the destination address that is different from the address assigned to the device; and a power controlling unit that suspends at least a part of a power supply to the demodulation unit and the analyzing unit for a remaining time of the time period for occupying the radio channel, the time period being described in the MAC header, when the determination unit determines that the channel usage rate stored in the storage unit is equal to or smaller than the threshold value.

According to a fifth aspect of the invention, there is provided a wireless communication device wirelessly connectable to an access point through a radio channel and capable of transmitting and receiving frames by occupying the radio channel for a certain time period, the device including: a demodulation unit that demodulates a frame received through the radio channel and outputs the demodulated frame as a received frame; an extraction unit that extracts Legacy Length and Legacy Rate from a PHY header included in the received frame output from the demodulation unit; a calculation unit that calculates an occupancy period for which a counterpart device that sent the received frame occupies the radio channel based on the Legacy Length and the Legacy Rate; an analyzing unit that operates to: analyze an MAC header included in the received frame output from the demodulation unit; and determine whether the received frame includes a destination address that is different from an address assigned to the device; a determination unit that determines whether a total time of a time required for receiving the received frame and the occupancy period calculated by the calculation unit equals to a remaining time of the time period for occupying the radio channel, the time period being described in the MAC header, when the analyzing unit determines that the received frame includes the destination address that is different from the address assigned to the device; and a power controlling unit that suspends at least a part of a power supply to the demodulation unit and the analyzing unit for the remaining time of the time period for occupying the radio channel, the time period being described in the MAC header, when the determination unit determines that the total time equals to the remaining time.

DETAILED DESCRIPTION OF THE EMBODIMENTS

Embodiments according to the present invention will be described below.

First Embodiment

Figure 1:
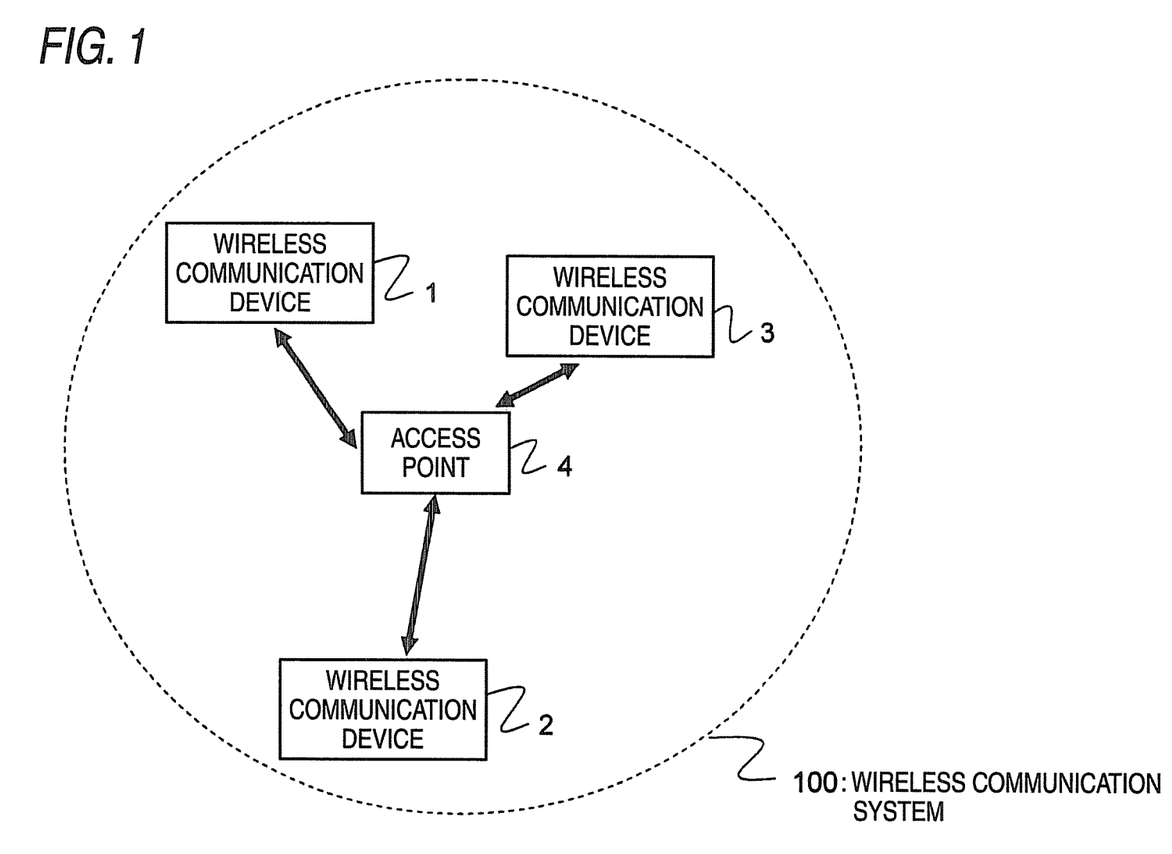
FIG. 1 is a block diagram showing a structure of a wireless communication system according to a first embodiment of the present invention.

A wireless communication system 100 according to a first embodiment of the present invention includes, as shown in FIG. 1, wireless communication devices 1, 2 and 3 and an access point 4. The wireless communication device 1, 2 and 3 and the access point 4 perform a communication with each other through a radio channel. The wireless communication system 100 is configured to be compatible with the IEEE802.11 standard.

Figure 2:
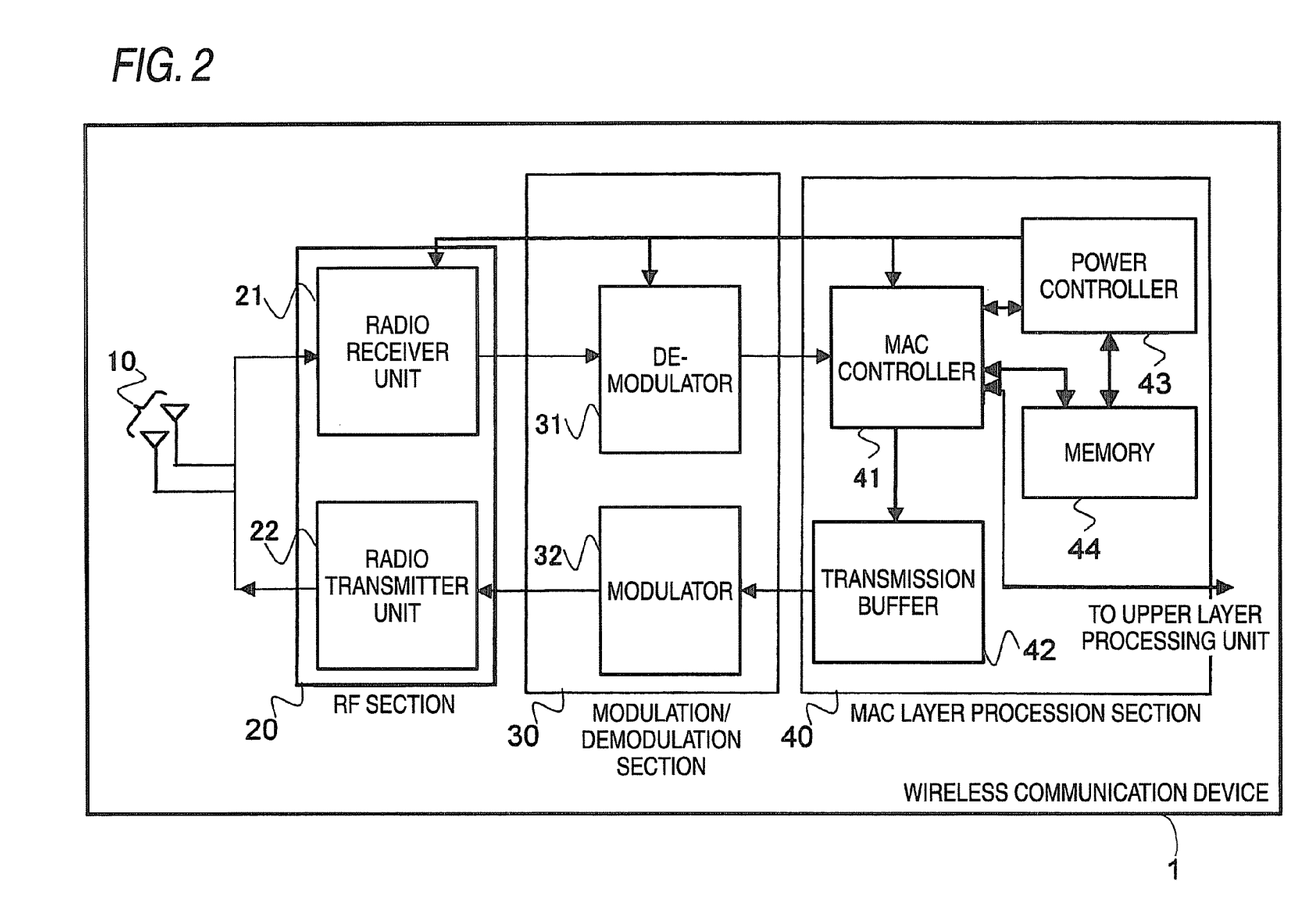
FIG. 2 is a block diagram showing a configuration of a wireless communication device according to the first embodiment.

FIG. 2 is a block diagram showing a configuration of the wireless communication device 1 according to the first embodiment. Configurations of the wireless communication devices 2 and 3 and the access point 4 are substantially the same.

The wireless communication device 1 according to the first embodiment includes an antenna 10, an RF (Radio Frequency) section 20, a modulation/demodulation section 30, and an MAC (Media Access Control) layer processing section 40. The RF section 20 has a radio receiver unit 21 and a radio transmitter unit 22. The modulation/demodulation section 30 has a demodulator 31 and a modulator 32. The MAC layer processing section 40 has an MAC controller 41, a transmission buffer 42, a power controller 43 and a memory 44.

The antenna 10 is connected to the radio receiver unit 21 and the radio transmitter unit 22. The radio receiver unit 21 is connected to the demodulator 31, and the radio transmitter unit 22 is connected to the modulator 32. The demodulator 31 is connected to the MAC controller 41 and the modulator 32 is connected to the transmission buffer 42. The MAC controller 41 is connected to the power controller 43, the memory 44, the transmission buffer 42 and an upper layer processing unit. The power controller 43 is connected to the MAC controller 41, the demodulator 31 and the radio receiver unit 21 and controls a power supply thereto. The wireless communication device 1 performs a communication with MIMO (Multi Input Multi Output).

The memory 44 stores the number of receptions of a frame and information indicating whether the wireless communication device 1 specified by a source address of a frame received through the antenna 10 transmitted a signal (CF_End signal) for suspending an occupancy of a radio channel in the past in correlation with each other every source address.

When the wireless communication device 1 transmits a radio signal, the upper layer processing unit transmits data to the MAC controller 41. The MAC controller 41 performs a processing such as an addition of an MAC header over the received data and transmits the processed data as a frame to the transmission buffer 42. The transmission buffer 42 temporarily stores the frames received from the MAC controller 41 in order. The transmission buffer 42 transmits the temporary stored frames to the modulator 32 in storage order. The modulator 32 performs a physical layer related processing and a modulation processing over the frame received from the transmission buffer 42. The radio transmitter unit 22 performs a D/A (Digital to Analog) conversion processing over the frame modulated by the modulator 32 and performs a frequency conversion into a frequency band of a wireless communication. The antenna 10 transmits, through a radio channel, the radio signal received from the modulator 32.

When the wireless communication device 1 receives the radio signal, the radio signal received through the radio channel by the antenna 10 is transmitted to the radio receiver unit 21. The radio receiver unit 21 performs a frequency conversion into a baseband over the radio signal received through the antenna 10 and then performs an A/D (Analog to Digital) conversion processing. The demodulator 31 demodulates the signal subjected to the A/D (Analog to Digital) conversion processing through the radio receiver unit 21 and performs the physical layer related processing, and transmits the processed signal as a frame to the MAC controller 41.

The MAC controller 41 analyzes the MAC header of the frame received from the demodulator 31.

The MAC controller 41 extracts a source address from the frame received from the demodulator 31. The MAC controller 41 reads, from the memory 44, the number of receptions of the frame stored in correlation with the source address thus extracted, and increases the number of receptions of the frame by one and performs overwriting to the memory 44.

The MAC controller 41 determines whether a destination address of the frame received from the demodulator 31 is itself or not. If the destination address of the frame received from the demodulator 31 is itself, the MAC controller 41 performs an MAC layer related processing over the frame received from the demodulator 31 and transmits the processed frame to the upper layer processing unit. On the other hand, if the destination address of the frame received from the demodulator 31 is not itself, the MAC controller 41 transmits, to the power controller 43, a source address of the extracted frame and a remaining time in which a radio channel is occupied through Long NAV set by the other wireless communication device (a time described on a Duration field).

If the frame received from the demodulator 31 is the signal (CF_End signal) for suspending the occupancy of the radio signal, the MAC controller 41 stores, in the memory 44, information indicative of "a transmission of the CF_End signal" stored in correlation with the source address.

If the source address and the time described on the Duration field are received from the MAC controller 41, the power controller 43 determines whether the reception processing is to be suspended or not depending on the source address thus received. A method of determining whether the power controller 43 is to stop the reception processing will be described below.

If it is determined that the reception processing is to be suspended, the power controller 43 suspends the supply of the power to the MAC controller 41, the demodulator 31 and the radio receiver unit 21 by the time described on the Duration field. The power controller 43 transmits a reception suspending signal for suspending the supply of the power to the MAC controller 41, the demodulator 31 and the radio receiver unit 21 as a method of suspending the supply of the power. Upon reception of the reception suspending signal, the MAC controller 41, the demodulator 31 and the radio receiver unit 21 block a line through which the power is supplied from a power supplying portion (not shown) respectively.

The power controller 43 may block the supply of the power to the MAC controller 41, the demodulator 31 and the radio receiver unit 21 by a shorter period than the time described on the Duration field. For example, in the case in which the wireless communication device 1 transmits the radio signal immediately after the occupancy of the radio channel through the other wireless communication device is ended or a certain time is required for normally operating the MAC controller 41, the demodulator 31 and the radio receiver unit 21 after the supply of the power is started again, the supply of the power may be suspended in a shorter time than the time described on the Duration field by a certain time.

After the power controller 43 suspends the supply of the power to the MAC controller 41, the demodulator 31 and the radio receiver unit 21, moreover, the time required for suspending the supply of the power may be measured by the power controller 43 or by the MAC controller 41, the demodulator 31 and the radio receiver unit 21 respectively.

On the other hand, if it is determined that the reception processing is not suspended, the power controller 43 discards the source address received from the MAC controller 41 and the remaining time of the Long NAV.

As the method of suspending the supply of the power to the MAC controller 41, the demodulator 31 and the radio receiver unit 21, it is also possible to employ a structure in which the power controller 43 transmits the reception suspending signal to the power managing portion and the power managing portion collectively suspends the supply of the power to the MAC controller 41, the demodulator 31 and the radio receiver unit 21.

Figure 3:
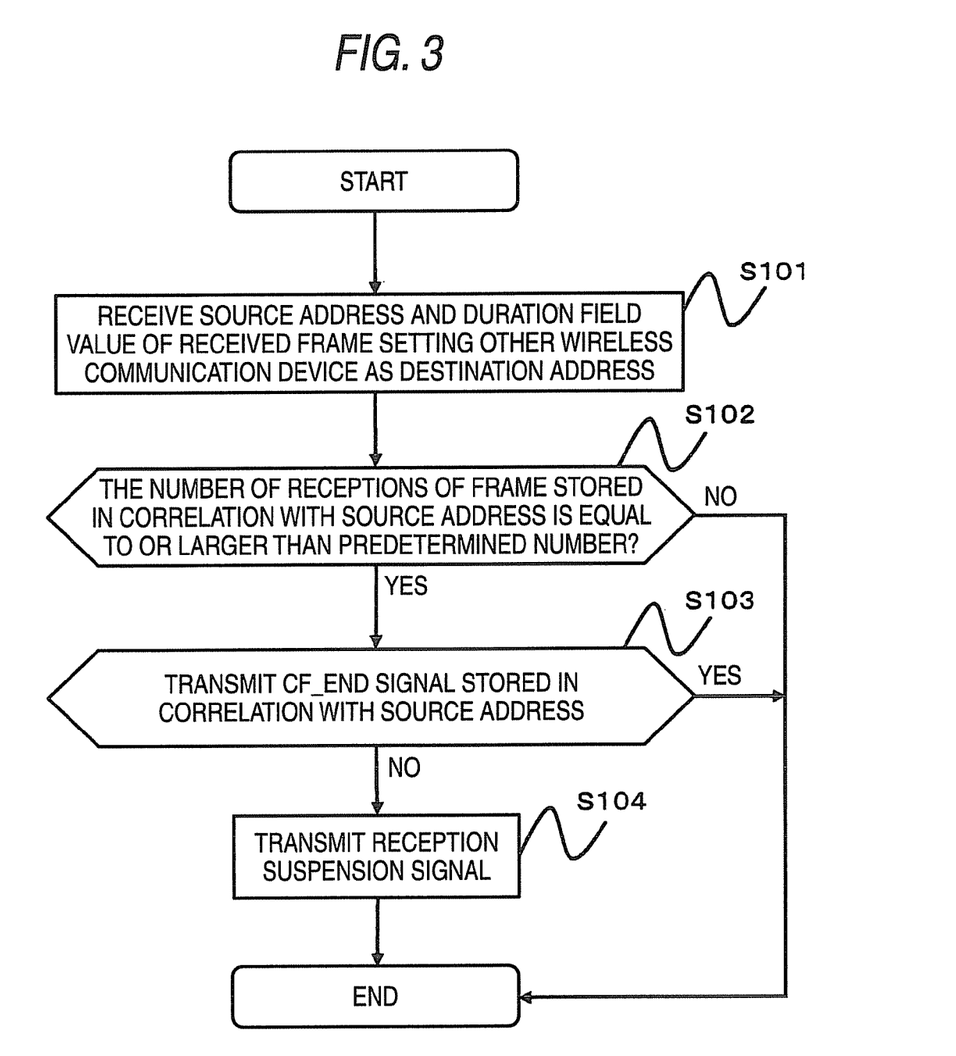
FIG. 3 is a flowchart showing an operation to be performed when determining a suspension of a reception processing of a power controller according to the first embodiment.

FIG. 3 is a flowchart showing an operation to be performed when the power controller 43 determines whether the reception processing is to be suspended or not.

First, the power controller 43 receives, from the MAC controller 41, a source address of a frame setting the other wireless communication device as a destination address and a remaining time for which the radio channel is occupied through the Long NAV set by the other wireless communication device (the time described on the Duration field) (Step S101).

Next, the power controller 43 determines whether or not the number of receptions of the frame stored in the memory 44 in correlation with the source address received from the MAC controller 41 is equal to or larger than a predetermined number (Step S102).

If the number of receptions of the frame is smaller than the predetermined number, the power controller 43 ends the operation.

On the other hand, if the number of receptions of the frame is equal to or larger than the predetermined number, the power controller 43 accesses to the memory 44 with the source address received from the MAC controller 41 and determines whether the wireless communication device 1 specified by the source address transmitted the CF_End signal in the past or not (Step S103).

If it is determined that the wireless communication device 1 specified by the source address transmitted the CF_End signal in the past, the power controller 43 ends the operation.

On the other hand, it is determined that the wireless communication device 1 specified by the source address has not transmitted the CF_End signal, the power controller 43 transmits the reception suspending signal to the MAC controller 41, the demodulator 31 and the radio receiver unit 21 (Step S104).

According to the wireless communication device 1 in accordance with the first embodiment, thus, only in the case in which there is received a frame transmitted from the wireless communication device which has not transmitted the CF_End signal, that is, a frame which is not addressed to the wireless communication device 1, the reception processing is suspended to enable a reduction in a possibility that the reception of the CF_End signal might fail and a reduction in power consumption without prolonging a period for a transmitting delay.

The reason is as follows. Also in the wireless communication device based on the IEEE802.11n, the function of transmitting the CF_End signal is not indispensable. Therefore, the wireless communication device which has not transmitted the CF_End signal can be guessed to have no function of transmitting the CF_End signal.

Upon reception of a frame having a destination address which is not addressed to the wireless communication device 1, furthermore, it is determined whether the reception processing is to be suspended or not only when the number of receptions of the frame from a source address is equal to or larger than a predetermined number. By performing the receiving suspension processing when the number of receptions of the frame is small and the radio channel is accidentally occupied by the wireless communication device which has not transmitted the CF_End signal, therefore, it is possible to prevent a failure in the reception of the CF_End signal.

In the wireless communication device 1 according to the embodiment, it is assumed that the power controller 43 determines whether the reception processing is to be suspended or not by using information indicating whether the CF_End signal has been transmitted or not. By using a transmitting frequency of the CF_End signal, however, it is also possible to decide whether the reception processing is to be suspended or not.

In this case, the memory 44 stores the number of receptions of the frame and the information indicative of the transmitting frequency of the CF_End signal sent from the wireless communication device 1 specified by the source address in correlation with each other every source address.

The power controller 43 accesses to the memory 44 based on the source address received from the MAC controller 41 and determines whether or not the transmitting frequency of the CF_End signal of the wireless communication device 1 specified by the source address is equal to or larger than a threshold at a step S103 shown in FIG. 3.

If the transmitting frequency of the CF_End signal of the wireless communication device 1 specified by the source address is equal to or larger than the threshold, the power controller 43 ends the operation.

On the other hand, if the transmitting frequency of the CF_End signal of the wireless communication device 1 specified by the source address is smaller than the threshold, the power controller 43 transmits the reception suspending signal to the MAC controller 41, the demodulator 31 and the radio receiver unit 21.

Consequently, in the case in which the radio channel is occupied by the wireless communication device 1 which has transmitted the CF_End signal and has a small transmitting frequency, the reception processing is suspended. Thus, it is possible to reduce power consumption while preventing an increase in the period of the transmitting delay.

Although whether the reception processing is to be suspended is determined every source address of a frame when the frame is received in the wireless communication device 1 according to the embodiment, moreover, it is also possible to decide whether the reception processing is to be suspended or not by using two information including a source address of the frame and TID (Traffic Identifier) indicative of a type of an application thereof.

In this case, the memory 44 stores the number of receptions of the frame and the information indicating whether the CF_End signal has been transmitted in correlation with each other every set of the source address and the TID.

The power controller 43 accesses to the number of receptions of the frame and the information indicating whether the CF_End signal has been transmitted which are stored in the memory 44 in correlation with the set of the source address and the TID, and performs the determination at the steps S102 and S103 shown in FIG. 3.

Only in the case in which there is received the frame transmitted from the wireless communication devices which do not transmit the CF_End signal when performing a communication through a specific application, that is, the frame having a destination address which is not addressed to the wireless communication device 1, consequently, the reception processing is suspended. Thus, it is possible to reduce power consumption without prolonging a period for a transmitting delay.

The wireless communication device 1 can also be implemented by using a general purpose computer apparatus as basic hardware, for example. More specifically, the MAC controller 41, the power controller 43 and the upper layer processing unit can be implemented by causing a processor provided in the computer apparatus to execute a program. At this time, the wireless communication device 1 may be implemented by previously installing the program in the computer apparatus, and may be implemented by storing the program in a recording medium such as a CD-ROM or distributing the program through a network to properly install the program in the computer apparatus. Moreover, the transmission buffer 42 and the memory 44 can be implemented by properly utilizing a storage medium such as a semiconductor memory, a hard disk or a CD-R, a CD-RW, a DVD-RAM or a DVD-R which is provided in the computer apparatus or is externally attached thereto.

Second Embodiment

A wireless communication device 1 according to a second embodiment and the wireless communication device 1 according to the first embodiment have substantially identical structures to each other, and perform different operations related to a determination for suspending the reception processing. The wireless communication device 1 is configured as a part of a wireless LAN system 100 based on the IEEE802.11e standards and standards including the same (for example, the IEEE802.11n standards).

An access point 4 transmits an informing signal (a Beacon signal) to a plurality of wireless communication devices 1, 2 and 3 connected to each other every certain time (for example, several tens of microseconds). The number of connecting terminals of the wireless communication device connected to the access point 4 and an occupancy rate of a radio channel are described on the informing signal.

In the case in which the wireless communication device 1 receives a frame for the informing signal from the access point 4, the frame is subjected to a reception processing by a radio receiver unit 21 and a demodulator 31 and is thus transmitted to the MAC controller 41.

The MAC controller 41 writes, to the memory 44, information described on the frame of the received informing signal, that is, the number of connecting terminals of the wireless communication device connected to the access point 4 and the occupancy rate of the radio channel together with a time that the informing signal is received.

The memory 44 stores the number of the connecting terminals of the wireless communication device connected to the access point 4 and the occupancy rate of the radio channel in correlation with the time that the informing signal is received. The memory 44 may store only the newest information about the informing signal.

Figure 4:
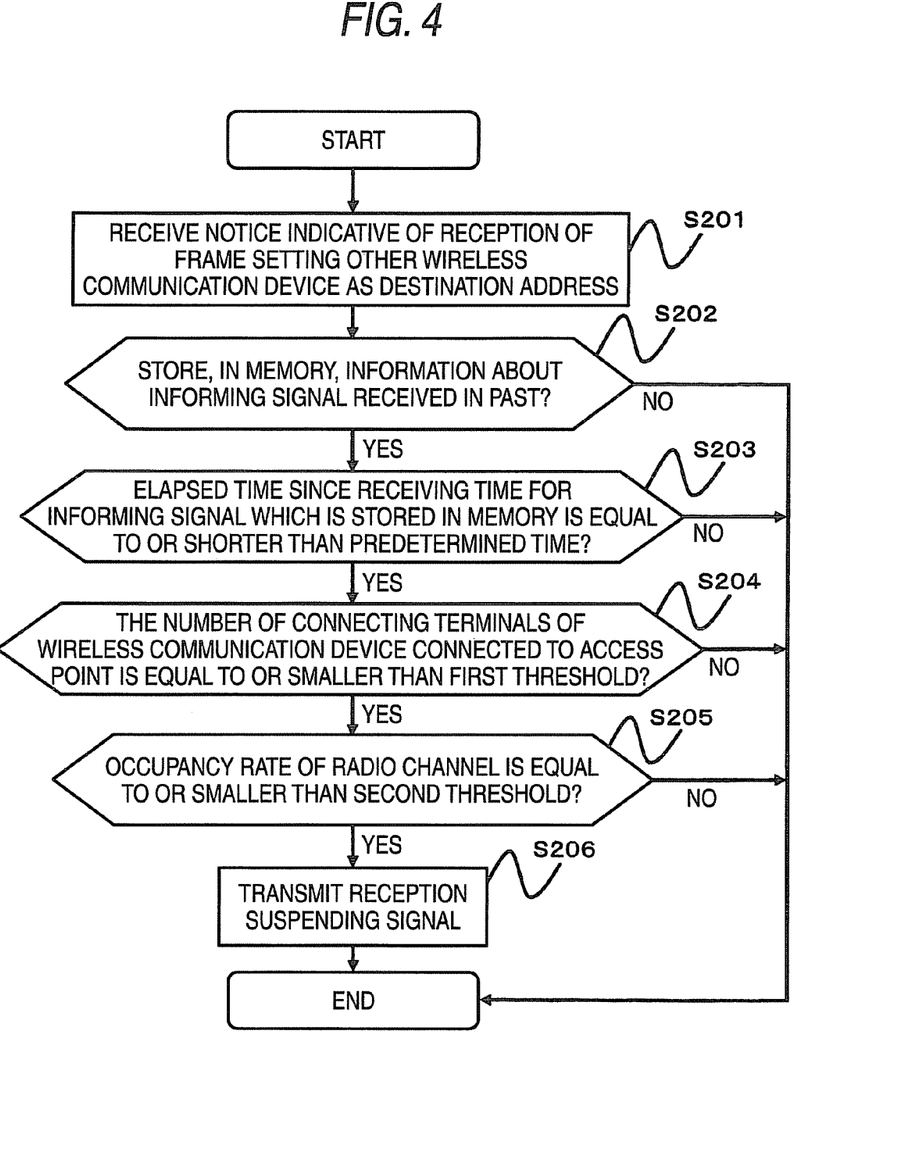
FIG. 4 is a flowchart showing an operation to be performed when determining a suspension of a reception processing of a power controller according to a second embodiment of the present invention.

FIG. 4 is a flowchart showing an operation to be performed when determining whether a power controller 43 is to stop a reception processing or not.

Upon reception of a frame setting the other wireless communication device as a destination address from the demodulator 31, first, the MAC controller 41 transmits, to the power controller 43, a notice indicative of the reception of the frame setting the other wireless communication device as the destination address.

Next, the power controller 43 receives, from the MAC controller 41, the notice indicative of the reception of the frame setting the other wireless communication device as the destination address (Step S201).

Then, the power controller 43 accesses to the memory 44 and determines whether information about an informing signal received in the past is stored or not (Step S202).

If the information about the informing signal received in the past is not stored in the memory 44, the power controller 43 ends the operation.

On the other hand, if the information about the informing signal received in the past is stored in the memory 44, the power controller 43 subsequently reads a time that the informing signal stored in the memory 44 is received, and determines whether a time passing since the same time is included in a predetermined time or not (Step S203).

If the Lime passing since the time that the informing signal stored in the memory 44 is received is not included in the predetermined time, the power controller 43 ends the operation. More specifically, if a predetermined time or more passes since the time that the informing signal stored in the memory 44 is received, the information about the informing signal is old. Therefore, the power controller 43 is not used for determining whether the reception processing is to be suspended or not, and ends the operation.

On the other hand, if the time passing since the time that the informing signal stored in the memory 44 is received is shorter than the predetermined time, the power controller 43 then reads, from the memory 44, the number of the connecting terminals of the wireless communication device connected to the access point and determines whether or not the number of the connecting terminals is equal to or smaller than a first threshold (Step S204). If the number of the connecting terminals of the wireless communication device connected to the access point is larger than the first threshold, the power controller 43 ends the operation.

On the other hand, if the number of the connecting terminals of the wireless communication device connected to the access point is equal to or smaller than the first threshold, the power controller 43 subsequently reads the occupancy rate of the radio channel from the memory 44 and determines whether or not the same occupancy rate is equal to or lower than a second threshold (Step S205).

If the occupancy rate of the radio channel is larger than the second threshold, the power controller 43 ends the operation. If the occupancy rate of the radio channel is equal to or smaller than the second threshold, the power controller 43 transmits a reception suspending signal for suspending a power supply to the MAC controller 41, the demodulator 31 and the radio receiver unit 21 (Step S206).

According to the wireless communication device 1 in accordance with the second embodiment, thus, in consideration of the information described on the informing signal, that is, the number of the connecting terminals of the wireless communication device connected to the access point and the occupancy rate of the radio channel, it is possible to reduce power consumption while preventing an increase in the period of the transmitting delay while suspending the reception processing in the case in which the frame setting the destination address which is not addressed to the wireless communication device 1 is received.

The number of the connecting terminals of the wireless communication device 1 is equal to or smaller than the threshold, and the occupancy rate of the radio channel is equal to or smaller than the second threshold. Even if the wireless communication device 1 cannot detect the interruption of the occupancy of the radio channel but the reception processing is continuously suspended irrespective of the interruption of the occupancy of the radio channel through the CF_End signal while the wireless communication device 1 suspends the reception processing, therefore, there is a low possibility that the radio channel might be further occupied by the other wireless communication device while the wireless communication device 1 suspends the reception processing.

In the case in which the wireless communication device occupied by the radio channel immediately before the suspension of the reception processing is different from the wireless communication device occupied by the radio channel immediately after the restart of the reception processing when the wireless communication device 1 suspends the reception processing and the wireless communication device 1 restarts the reception processing after the passage of a certain period, the wireless communication device 1 may change the first and second thresholds.

At this time, the power controller 43 performs a processing of changing the second threshold of the occupancy rate of the radio channel from 40% to 30% or decreasing the first threshold of the number of the connecting terminals of the wireless communication device 1, for example.

In the wireless communication device 1 according to the second embodiment, moreover, the power controller 43 may decide whether the reception processing is to be suspended or not by storing, in the memory 44, either the number of the terminals of the wireless communication device 1 or the occupancy rate of the radio channel and using only either of them.

Third Embodiment

A wireless communication device 1 according to a third embodiment and the wireless communication device 1 according to the first embodiment have identical structures to each other, and perform different operations related to a method of determining a suspension of a reception processing. In the wireless communication device 1 according to the third embodiment, a memory 44 does not need to be provided.

The wireless communication device 1 is constituted as a part of a wireless LAN system 100 based on the IEEE802.11n standards. Wireless communication devices 1, 2 and 3 describe Legacy Rate information and Legacy Length information on a PLCP (physical medium dependent) header of a frame to be transmitted. At this time, a result obtained by dividing the Legacy Length information by the Legacy Rate information serves as a period for which a wireless communication device to be a transmitting source of a frame occupies a channel to transmit a plurality of frames.

A wireless communication device that is compatible with an L-SIG TXOP protection (Legacy signal field transmission opportunity protection) describes, on the PLCP header, the Legacy Rate information and the Legacy length information for transmitting the frames, thereby causing the other wireless communication devices to restrain the transmission of the frame for a period required for transmitting the frames.

Figure 5:
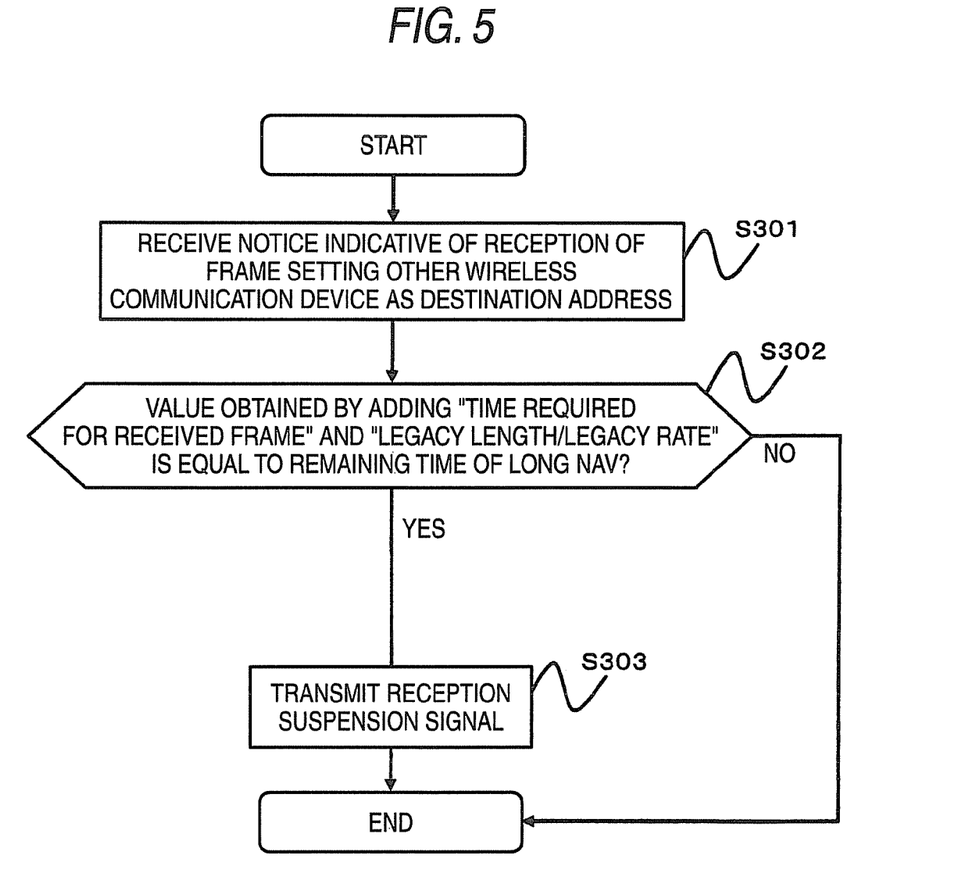
FIG. 5 is a flowchart showing an operation to be performed when determining a suspension of a reception processing of a power controller according to a third embodiment of the present invention.

FIG. 5 is a flowchart showing an operation to be performed when determining whether a power controller 43 suspends the reception processing or not.

Upon reception of a frame setting the other wireless communication device as a destination address from the demodulator 31, first, an MAC controller 41 transmits, to the power controller 43, a notice indicative of the reception of the frame setting the other wireless communication device as the destination address.

The MAC controller 41 transmits, to the power controller 43, a time "t1" required for receiving a frame setting the other wireless communication device as a destination address. The time "t1" required for receiving the frame setting the other wireless communication device as the destination address indicates a time required for the MAC controller 41 to receive the frame after the transmission of the frame from the wireless communication device to be a transmitting source.

The MAC controller 41 extracts the Legacy Rate information and the Legacy Length information which are described on the PLCP header of the frame. The MAC controller 41 transmits, to the power controller 43, a time "t2" obtained by dividing the Legacy Length information by the Legacy Rate information. The time "t2" obtained by dividing the Legacy Length information to be used in the L-SIG TXOP Protection by the Legacy Rate information indicates a period for which the radio channel is occupied by the other wireless communication device, and the occupancy period is not suspended.

The MAC controller 41 extracts a remaining time (a time described on a Duration field) "t3" occupied by the radio channel through Long NAV set by the other wireless communication device and transmits the "t3" to the power controller 43.

Next, the power controller 43 receives, from the MAC controller 41, a notice indicating that the frame setting the other wireless communication device as a destination address is received, the time "t1" required for receiving the frame, the time "t2" obtained by dividing the Legacy Length information by the Legacy Rate information and the remaining time "t3" of the Long NAV (Step S301).

Subsequently, the power controller 43 adds the time "t1" required for receiving the frame setting the other wireless communication device as the destination address and the time "t2" obtained by dividing the Legacy Length information by the Legacy Rate information. The power controller 43 determines whether a result of the addition "t1+t2" and the remaining time "t3" of the Long NAV are identical to each other or not (Step S302).

If the result of the addition "t1+t2" and the remaining time "t3" of the Long NAV are identical to each other, the power controller 43 transmits a reception suspending signal for suspending a power supply to the MAC controller 41, the demodulator 31 and a radio receiver unit 21 (Step S303). On the other hand, if the result of the addition and the remaining time of the Long NAV are not identical to each other, the power controller 43 ends the operation.

In the case in which the Legacy Rate information and the Legacy Length information which are not used in the L-SIG TXOP Protection are described on the PLCP header of the frame, the MAC controller 41 and the power controller 43 decide that the reception processing is not suspended.

According to the wireless communication device 1 in accordance with the third embodiment, thus, it is determined whether or not a channel occupying time obtained from the Legacy Length information and the Legacy Rate information and a channel occupying time obtained by the Long NAV described on the Duration field are equal to each other, and it is confirmed that the occupancy of the radio channel is not suspended and the reception processing is thus suspended. Consequently, it is possible to reduce power consumption without failing in the reception of the CF_End signal.

In the case in which the Legacy Length information and the Legacy Rate information are described on the PLCP header of the frame in order to set the L-SIG TXOP protection, the radio channel is necessarily occupied by the other wireless communication device by a time obtained by dividing the Legacy Length information by the Legacy Rate information. Therefore, the occupancy of the radio channel can be prevented from being suspended by the CF_End signal for the period in which the Long NAV is set. Even if the reception processing is suspended for the same period, the wireless communication device 1 can be prevented from failing in the reception of the CF_End signal.

Fourth Embodiment

A wireless communication device 1 according to a fourth embodiment and the wireless communication device 1 according to the first embodiment have substantially identical structures to each other, and perform different operations related to a method of determining a suspension of a reception processing. In the wireless communication device 1 according to the fourth embodiment, the method of determining a suspension of a reception processing in the wireless communication device 1 according to the first to third embodiments is applied in parallel.

First, by the method of determining a suspension of a reception processing using the Legacy Length information and the Legacy Rate information which has been described in the third embodiment, a power controller 43 determines whether a reception processing is to be suspended or not.

If it is determined that the reception processing is not suspended, the power controller 43 subsequently determines whether the reception processing is to be suspended or not by the method of determining a suspension of a reception processing using information about the presence of the transmission of the CF_End signal described in the first embodiment.

If it is determined that the reception processing is not suspended, furthermore, the power controller 43 then determines whether the reception processing is to be suspended or not by the method of determining a suspension of a reception processing using the number of the connecting terminals of the wireless communication device 1 connected to the access point or the occupancy rate of the radio channel described in the second embodiment.

Also in any of the three methods of determining a suspension of a reception processing, if it is determined that the reception processing is not suspended, the power controller 43 does not stop the reception processing.

On the other hand, if it is determined that the reception processing is suspended by any of the three methods of determining a suspension of a reception processing, the power controller 43 suspends the reception processing at that time.

By applying the method of determining a suspension of a reception processing in the wireless communication device 1 according to the first to third embodiments in parallel, thus, it is possible to reduce the power consumption of the wireless communication device 1 more greatly.

If the remaining time of the Long NAV is equal to or less than a threshold before starting the determination processing for suspending the reception processing by the method, moreover, the power controller 43 does not need to stop the reception processing.

The threshold is set to be a time required for transmitting six frames of 1500 Bytes at a data rate of 24 Mbps (Mega Bits per second), that is, 3 msec (milliseconds), for example. In this case, if the remaining time of the Long NAV is equal to or shorter than 3 msec, the power controller 43 does not transmit a reception suspending signal for suspending a power supply to an MAC controller 41, a demodulator 31 and a radio receiver unit 21.

Since the reception processing is not suspended when the remaining time of the Long NAV is very short, thus, it is possible to prevent an increase in the power consumption through a restart of the reception processing instantly after the power controller 43 suspends the reception processing.

Moreover, it is also possible to decide whether the power controller 43 suspends the reception processing or not depending on a type of an application specified by TID.

For example, it is determined whether the power controller 43 suspends the reception processing or not depending on whether the type of the application specified by the TID handles voice information or not. In a communication related to the voice information, a size of one frame is small and a strict demand for a data transmitting delay is strict. In this case, even if the power controller 43 suspends the reception processing, the reception processing can be suspended for a short period and there is obtained a small effect of reducing the power consumption.

Therefore, the power controller 43 does not stop the reception processing if the type of the application specified by the TID handles the voice information.

On the other hand, if the type of the application specified by the TID handles information other than the voice information, the power controller 43 determines whether the reception processing is suspended or not depending on the method of determining a suspension of a reception processing in the wireless communication device 1 according to the first to third embodiments.

If the type of the application specified by the TID is the voice information, thus, the reception processing is not suspended. Consequently, it is possible to relieve a load of the wireless communication device 1 without performing a processing with the suspension and restart of the reception processing through the power controller 43.

Fifth Embodiment

A wireless communication device 1 according to a fifth embodiment and the wireless communication device 1 according to the first embodiment have substantially identical structures to each other, and perform different operations related to a method of determining a suspension of a reception processing. In the wireless communication device 1 according to the fifth embodiment, the method of determining a suspension of a reception processing in the wireless communication device 1 according to the first to third embodiments is applied in parallel. In the fifth embodiment, description will be given to a processing to be performed by the wireless communication device 1 when transmitting a message after the reception processing is suspended and restarted.

In the case in which the reception processing is suspended by using the information indicative of the presence of the transmission of the CF_End signal described in the first embodiment and the case in which the reception processing is suspended by using the Legacy Length information and the Legacy Rate information described in the third embodiment, the wireless communication device 1 restarts a reception processing and then stands by for a certain period, and thereafter transmits a message. The standby period before the transmission is set to be a time obtained by adding a DIFS (distributed coordination function interframe space) and a back-off processing time in the IEEE802.11 standards, for example.

In the case in which the reception processing is suspended by using the information indicative of a transmitting frequency of the CF_End signal described in the first embodiment and the case in which the reception processing is suspended by using the number of the connecting terminals of the wireless communication device 1 connected to the access point and the occupancy rate of the radio channel described in the second embodiment, the wireless communication device 1 performs a processing of transmitting a frame depending on a situation of the radio channel.

Figure 6:
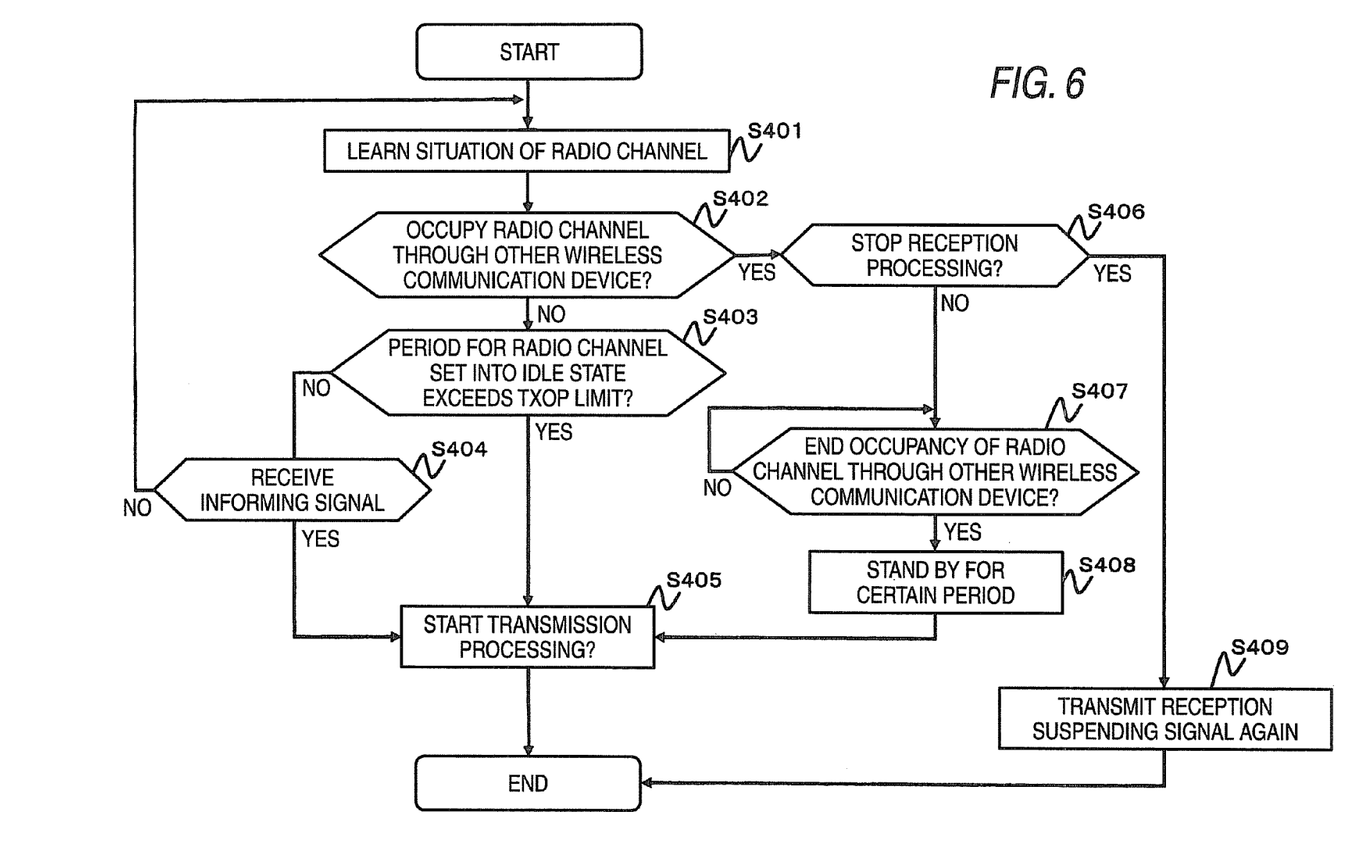
FIG. 6 is a flowchart showing an operation to be performed when transmitting a frame of a wireless communication device according to a fifth embodiment of the present invention.

FIG. 6 is a flowchart showing an operation of the wireless communication device 1 which is to be performed when performing the processing of transmitting a frame depending on a situation of the radio channel.

First, the wireless communication device 1 learns the situation of the radio channel (Step S401). If the radio channel is occupied by the other wireless communication device, it is assumed that a BUSY state is set. If the radio channel is not occupied by any other wireless communication device, it is assumed that an IDLE state is set.

Next, the wireless communication device 1 determines whether the radio channel is occupied by the other wireless communication device or not, that is, the radio channel is set into the BUSY state or the IDLE state (Step S402).

If it is determined that the radio channel is set into the IDLE state, the wireless communication device 1 determines whether a period for the IDLE state exceeds TXOP Limit (transmission opportunity limit) or not (Step S403).

If it is determined that the period for the IDLE state exceeds the TXOP Limit, the wireless communication device 1 starts the processing of transmitting a frame (Step S405).

On the other hand, if it is determined that the period for the IDLE state does not exceed the TXOP Limit, the wireless communication device 1 determines whether an informing signal is received or not (Step S404).

If the informing signal is received, the wireless communication device 1 starts the processing of transmitting a frame (Step S405). On the other hand, if the informing signal is not received, the wireless communication device 1 learns the situation of the radio channel again to start the processing of transmitting a frame.

If the wireless communication device 1 determines that the radio channel is set into the BUSY state at the Step S402, the method of determining a suspension of a reception processing described in the first to third embodiments is used to decide whether the reception processing is suspended or not (Step S406). If it is determined that the reception processing is suspended, a power controller 43 transmits a reception suspending signal for suspending a power supply to an MAC controller 41, a demodulator 31 and a radio receiver unit 21 again (Step S409).

On the other hand, if it is determined that the reception processing is not suspended, the wireless communication device 1 determines whether the occupancy of the radio channel through the other wireless communication device is ended or not (Step S407). If the occupancy of the radio channel through the other wireless communication device is not ended, the wireless communication device 1 continuously determines whether the occupancy of the radio channel through the other wireless communication device is ended or not.

On the other hand, if the occupancy of the radio channel through the other wireless communication device is ended, the wireless communication device 1 stands by for a certain period (Step S408). After standing by for the certain period before the transmission, the wireless communication device 1 starts the processing of transmitting a frame (Step S405).

According to the wireless communication device 1 in accordance with the fifth embodiment, thus, it is possible to suppress an increase in a period for a transmitting delay by performing the processing of transmitting a frame after restarting the reception processing according to a method of suspending the reception processing while suspending the reception processing on a predetermined condition to reduce power consumption.

Whether the radio channel is set into the BUSY state or the IDLE state may be determined after the Long NAV is ended or may be periodically determined while the Long NAV is set.

Sixth Embodiment

A wireless communication device 1 according to a sixth embodiment and the wireless communication device 1 according to the first embodiment have substantially identical structures to each other except for a transmission buffer 42, and perform different operations related to a method of determining a suspension of a reception processing.

The transmission buffer 42 provided in the wireless communication device 1 according to the sixth embodiment is constituted by a cue for a voice and a general purpose cue. A transmission frame related to voice information is stored in the cue for a voice and a transmission frame related to information other than the voice information is stored in the general purpose cue.

In the wireless communication device 1 according to the sixth embodiment, the method of determining a suspension of a reception processing through a power controller 43 of the wireless communication device 1 according to the first to third embodiments is applied in parallel.

In the case in which an amount of a transmission frame stored in the cue for a voice of the transmission buffer 42 is equal to or larger than a certain amount, the power controller 43 does not perform a processing related to a receiving suspension processing. On the other hand, if the amount of the transmission frame stored in the cue for a voice of the transmission buffer 42 is smaller than the certain amount, the power controller 43 transmits a reception suspending signal in accordance with the method of determining a suspension of a reception processing.

According to the wireless communication device 1 in accordance with the sixth embodiment, thus, if a transmission frame giving a strict demand for a delay of an application such as the voice information is stored in a certain amount or more in the transmission buffer 42, it is possible to shorten a time required for transmitting the transmission frame stored in the transmission buffer 42 without performing the receiving suspension processing.

In the case in which a total amount of the transmission frames stored in the cue for a voice and the general purpose cue in the transmission buffer 42, the power controller 43 does not need to perform a processing related to the receiving suspension processing.

Referring to a transmission frame stored in the transmission buffer 42, moreover, the power controller 43 compares an elapsed time from a storage of the transmission frame in the transmission buffer 42 with a limit time for a signal delay described every transmission frame, and does not perform the processing related to the receiving suspension processing when the elapsed time is equal to or longer than a certain percentage of the limit time for the signal delay.

In the case in which the amount of the transmission frame stored in the cue for a voice of the transmission buffer 42 is equal to or larger than a certain amount, moreover, the power controller 43 may use only the method of determining a suspension of a reception processing using the information indicative of the presence of the transmission of the CF_End signal described in the first embodiment or the method of determining a suspension of a reception processing using Legacy Length information and Legacy Rate information described in the third embodiment.

Thus, it is possible to prevent an increase in a delay time required for the transmission of the frame stored in the transmission buffer 42 while suspending the reception processing to reduce power consumption.

Seventh Embodiment

A wireless communication device 1 according to a seventh embodiment and the wireless communication device 1 according to the first embodiment have substantially identical structures to each other except for an antenna 10, and perform different operations related to a method of determining a suspension of a reception processing.

The wireless communication device 1 transmits/receives data with MIMO capable of implementing a high speed and high stable communication. The wireless communication device 1 transmits/receives a CF_End signal through SISO capable of performing a communication with a low power consumption. The reason is that the CF_End signal is to be correctly received from a wireless communication device based on the IEEEa/b/g standards, that is, a wireless communication device which is not MIMO compatible.

In the wireless communication device 1 according to the seventh embodiment, the method of determining a suspension of a reception processing in the wireless communication device 1 according to the first to third embodiments is applied in parallel.

In the case in which it is determined that the reception processing is suspended by the method of determining a suspension of a reception processing, the wireless communication device 1 changes a receiving method from the MIMO to the SISO. Also in the case in which the wireless communication device 1 receives the radio signal through the SISO, it can receive the CF_End signal.

According to the wireless communication device 1 in accordance with the seventh embodiment, thus, it is possible to reduce the power consumption while enabling the reception of the CF_End signal while performing a change from the MIMO to the SISO.

It is necessary to correctly receive the CF_End signal by the wireless communication device in accordance with only the IEEEa/b/g standards. For this reason, the CF_End signal is transmitted/received at such a data rate that the wireless communication device in accordance with only the IEEEa/b/g standards can receive the same signal.

Therefore, the wireless communication device 1 may prepare a method of receiving only a frame at a communicating speed at which the wireless communication device in accordance with only the IEEEa/b/g standards can perform the reception, that is, a method capable of receiving a frame with a low power consumption.

In the case in which it is determined that the reception processing is to be suspended by the method of determining a suspension of a reception processing, the power controller 43 performs a change into the method of receiving only a frame at a communicating speed at which the wireless communication device in accordance with only the IEEEa/b/g standards can perform the reception, and receives the CF_End signal.

Thus, it is possible to reduce the power consumption while enabling the reception of the CF_End signal.

It is to be understood that the present invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiments. Further, the components in different embodiments may be used appropriately in combination.

What is claimed is:

1. A wireless communication device capable of transmitting and receiving frames by occupying a radio channel for a certain time period, the device comprising:
    a demodulation unit that demodulates a frame received through the radio channel and outputs the demodulated frame as a received frame;
    an analyzing unit that operates to:
        analyze an MAC header included in the received frame output from the demodulation unit;
        determine whether the received frame includes a destination address that is different from an address assigned to the device; and
        determine, when determined that the destination address is different from the address assigned to the device, whether the received frame includes a suspension signal for suspending the occupancy of the radio channel;
    a storage unit that stores a source address included in the received frame when the analyzing unit determines that the received frame includes the suspension signal;
    a determination unit that determines whether the source address included in the received frame is previously stored in the storage unit when the analyzing unit determines that the received frame includes the destination address that is different from the address assigned to the device; and
    a power controlling unit that suspends at least a part of a power supply to the demodulation unit and the analyzing unit for a remaining time of the time period for occupying the radio channel, the time period being described in the MAC header, when the determination unit determines that the source address included in the received frame is not previously stored in the storage unit.

2. The device according to claim 1, wherein storage unit stores the number of receptions of the transmission frame for every source addresses, and
    wherein the power controlling unit stops suspending the power supply when the number of receptions of the source address included in the received frame is equal to or smaller than a predetermined number.

3. The device according to claim 1, wherein the power controlling unit suspends the power supply for a time period that is shorter than the remaining time of the time period for occupying the radio channel.

4. The device according to claim 1, wherein the power controlling unit stops suspending the power supply when the remaining time of the time period for occupying the radio channel is shorter than a predetermined time.

5. The device according to claim 1 further comprising a transmission buffer that temporarily stores a transmission frame to be transmitted to a counterpart device of the communication, wherein the power controlling unit stops suspending the power supply when the number of transmission frames stored in the transmission buffer is equal to or larger than a predetermined number.

6. The device according to claim 5, wherein the power controlling unit stops suspending the power supply when the number of the transmission frames having high priority stored in the transmission buffer is equal to or larger than the predetermined number.

7. The device according to claim 1 further comprising a transmission buffer that temporarily stores a transmission frame to be transmitted to a counterpart device of the communication,
wherein the power controlling unit stops suspending the power supply when a duration of the transmission frame in the transmission buffer is equal to or longer than a certain percentage of a transmitting delay limit time of the transmission frame.

8. The device according to claim 1 further comprising a plurality of antennas for transmitting and receiving the frames through the radio channel,
wherein one of the antennas is used for transmitting and receiving the frames through the radio channel while the power controlling unit is suspending a part of the power supply to the demodulation unit and the analyzing unit.

9. A wireless communication device capable of transmitting and receiving frames by occupying a radio channel for a certain time period, the device comprising:
a demodulation unit that demodulates a frame received through the radio channel and outputs the demodulated frame as a received frame;
an analyzing unit that operates to:
analyze an MAC header included in the received frame output from the demodulation unit;
determine whether the received frame includes a destination address that is different from an address assigned to the device; and
determine, when determined that the destination address is different from the address assigned to the device, whether the received frame includes a suspension signal for suspending the occupancy of the radio channel;
a storage unit that stores a transmission frequency of the suspension signal in correlation with a source address included in the received frame when the analyzing unit determines that the received frame includes the suspension signal;
a determination unit that determines whether the transmission frequency corresponding to the source address included in the received frame is equal to or lower than a threshold value when the analyzing unit determines that the received frame includes the destination address that is different from the address assigned to the device; and
a power controlling unit that suspends at least a part of a power supply to the demodulation unit and the analyzing unit for a remaining time of the time period for occupying the radio channel, the time period being described in the MAC header, when the determination unit determines that the transmission frequency corresponding to the source address included in the received frame is equal to or lower than the threshold value.

10. A wireless communication device wirelessly connectable to an access point through a radio channel and capable of transmitting and receiving frames by occupying the radio channel for a certain time period, the device comprising:
a demodulation unit that demodulates a frame received through the radio channel and outputs the demodulated frame as a received frame;
an analyzing unit that operates to:
analyze an MAC header included in the received frame output from the demodulation unit;
determine whether the received frame includes a destination address that is different from an address assigned to the device; and
determine, when determined that the destination address is different from the address assigned to the device, whether the received frame includes a notification signal sent from the access point;
a storage unit that stores the number of connections established by the access point with other devices described in the notification signal when the analyzing unit determines that the received frame includes the notification signal;
a determination unit that determines whether the number of connections stored in the storage unit is equal to or smaller than a threshold value when the analyzing unit determines that the received frame includes the destination address that is different from the address assigned to the device; and
a power controlling unit that suspends at least a part of a power supply to the demodulation unit and the analyzing unit for a remaining time of the time period for occupying the radio channel, the time period being described in the MAC header, when the determination unit determines that the number of connections stored in the storage unit is equal to or smaller than the threshold value.

11. The device according to claim 10, wherein the threshold value is reset to a smaller value when a counterpart device of the communication established immediately before the suspension of the power supply is different from a counterpart device of the communication established immediately after the suspension of the power supply.

12. A wireless communication device wirelessly connectable to an access point through a radio channel and capable of transmitting and receiving frames by occupying the radio channel for a certain time period, the device comprising:
a demodulation unit that demodulates a frame received through the radio channel and outputs the demodulated frame as a received frame;
an analyzing unit that operates to:
analyze an MAC header included in the received frame output from the demodulation unit;
determine whether the received frame includes a destination address that is different from an address assigned to the device; and
determine, when determined that the destination address is different from the address assigned to the device, whether the received frame includes a notification signal sent from the access point;
a storage unit that stores a channel usage rate of the radio channel by the access point described in the notification signal when the analyzing unit determines that the received frame includes the notification signal;
a determination unit that determines whether the channel usage rate stored in the storage unit is equal to or smaller than a threshold value when the analyzing unit determines that the received frame includes the destination address that is different from the address assigned to the device; and
a power controlling unit that suspends at least a part of a power supply to the demodulation unit and the analyzing unit for a remaining time of the time period for occupying the radio channel, the time period being described in the MAC header, when the determination unit determines that the channel usage rate stored in the storage unit is equal to or smaller than the threshold value.

13. A wireless communication device wirelessly connectable to an access point through a radio channel and capable of transmitting and receiving frames by occupying the radio channel for a certain time period, the device comprising:
   a demodulation unit that demodulates a frame received through the radio channel and outputs the demodulated frame as a received frame;
   an extraction unit that extracts Legacy Length and Legacy Rate from a PHY header included in the received frame output from the demodulation unit;
   a calculation unit that calculates an occupancy period for which a counterpart device that sent the received frame occupies the radio channel based on the Legacy Length and the Legacy Rate;
   an analyzing unit that operates to:
      analyze an MAC header included in the received frame output from the demodulation unit; and
      determine whether the received frame includes a destination address that is different from an address assigned to the device; a determination unit that determines whether a total time of a time required for receiving the received frame and the occupancy period calculated by the calculation unit equals to a remaining time of the time period for occupying the radio channel, the time period being described in the MAC header, when the analyzing unit determines that the received frame includes the destination address that is different from the address assigned to the device; and
   a power controlling unit that suspends at least a part of a power supply to the demodulation unit and the analyzing unit for the remaining time of the time period for occupying the radio channel, the time period being described in the MAC header, when the determination unit determines that the total time equals to the remaining time.

* * * * *